BEST AVAILABLE COPY

June 7, 1927.

Re. 16,647

F. D. CHAPMAN

IRONING MACHINE

Original Filed Sept. 11, 1922 3 Sheets-Sheet 1

Inventor:
Frank D. Chapman
By Rector, Hibben, Davis & Macauley
Attys.

June 7, 1927. Re. 16,647

F. D. CHAPMAN

IRONING MACHINE

Original Filed Sept. 11, 1922 3 Sheets-Sheet 2

Inventor:
Frank D. Chapman,
Rector Hibben Davis & Macauley
Attys.

June 7, 1927.

F. D. CHAPMAN

IRONING MACHINE

Original Filed Sept. 11, 1922 3 Sheets-Sheet 3

Re. 16,647

Inventor:
Frank D. Chapman,
By Rector Libben Davis & Macauley
Attys.

Reissued June 7, 1927. Re. 16,647

UNITED STATES PATENT OFFICE.

FRANK D. CHAPMAN, OF BERLIN, WISCONSIN, ASSIGNOR OF ONE-HALF TO ELECTRIC HOUSEHOLD UTILITIES CORPORATION, OF CHICAGO, ILLINOIS, A CORPORATION OF ILLINOIS.

IRONING MACHINE.

Original No. 1,536,771, dated May 5, 1925, Serial No. 587,493, filed September 11, 1922. Application for reissue filed September 11, 1926. Serial No. 134,902.

This invention relates to improvements in ironing machines and has for its principal object to provide a machine of this character which is especially adapted for household use.

A further object of the invention is to provide an ironing machine which is relatively small and compact and in which the parts are so constructed and pivoted as to permit of its being folded, when not in use, to occupy a minimum amount of space.

A still further object of the invention is to provide a power driven machine having a plurality of rolls or mangles which may be heated by gas, steam, or other suitable medium, and which will be simple in construction, comparatively inexpensive to manufacture, and more efficient in operation than those which have heretofore been proposed.

In the accompanying drawings in which like numerals designate like parts in all the views.

Referring to the said drawings, it will be seen that the machine comprises a frame composed of the horizontal members 10 and the upright members 11 and 12, the lower ends of the latter being secured in spaced relation to the members 10, while their upper ends are connected together as by bolts 13 forming a substantially triangular framework. The said members 10 are provided with suitable rollers 14 whereby the device may be readily moved over the floor, as will be readily apparent.

Figure 1:
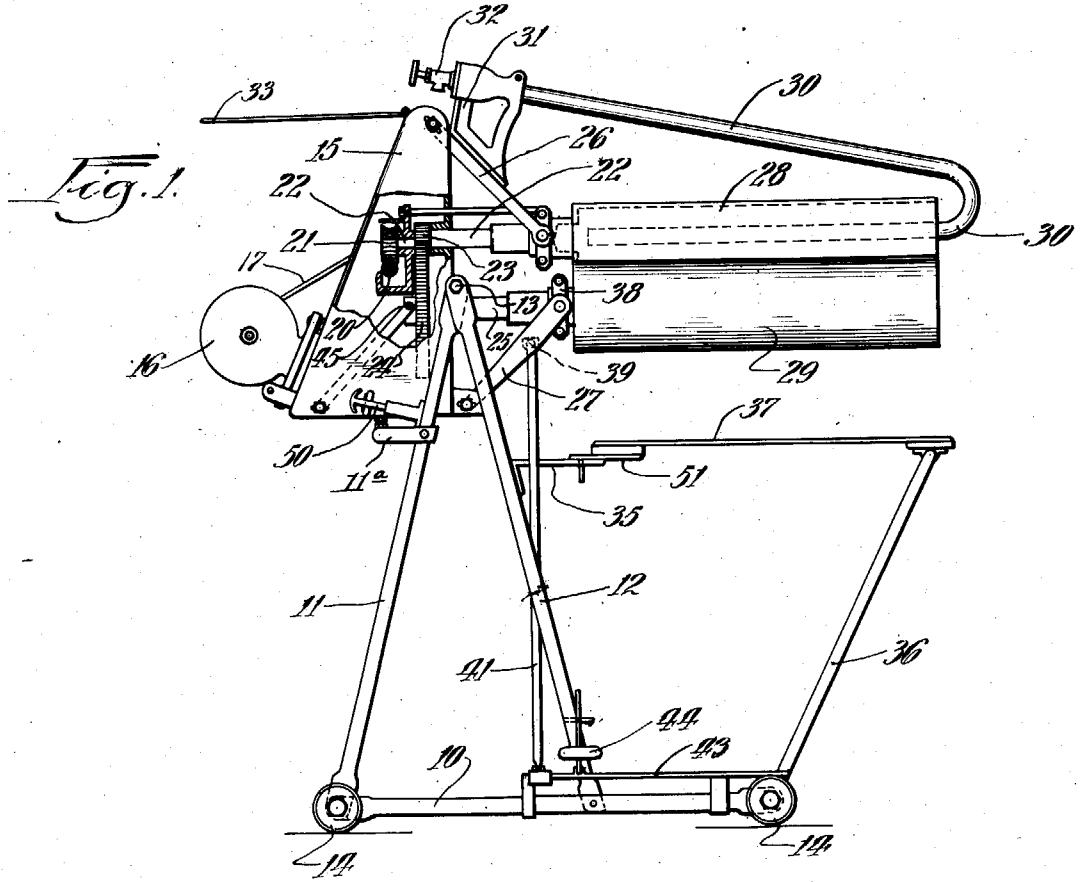
Figure 1 is a front view of a machine made in accordance with the present invention, a portion of the head or housing being broken away to more clearly illustrate the interior construction, and the parts being shown in their operative positions.
Figure 2:
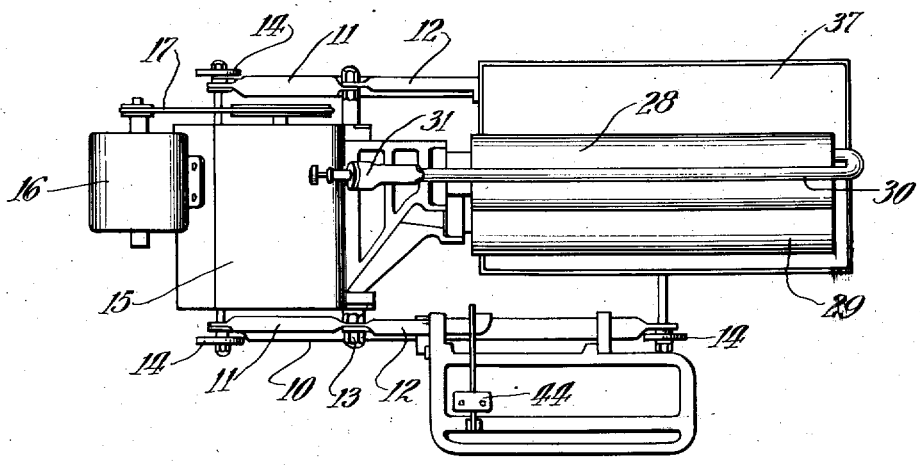
Fig. 2 is a plan view of the parts shown in Fig. 1.
Figure 3:
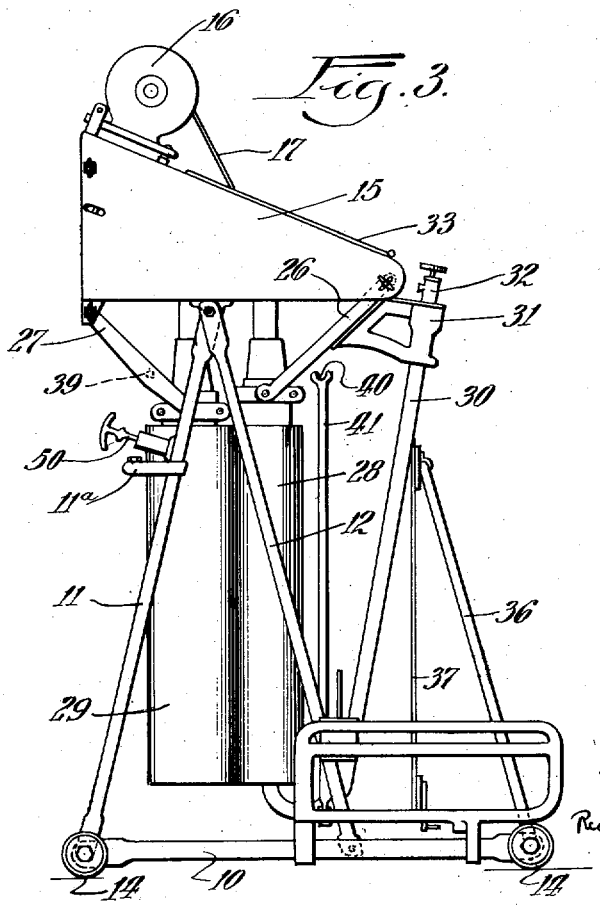
Fig. 3 is a view similar to Fig. 1 illustrating the parts in their folded positions.

The connections 13 serve as a pivot for supporting the substantially triangular shaped auxiliary supporting frame or housing 15, to which is secured a suitable electric motor, or other driving means 16, which is connected by means of a belt 17 to a pulley 18 carried by a shaft 19 suitably journaled in the said housing and carrying a worm 20 which meshes with a worm gear 21 rigidly mounted upon a shaft 22 extending at right angles to the shaft 19, see Figs. 1 and 3.

The said shaft 22 carries a pinion 23, which meshes with a gear 24, mounted upon a shaft 25, journaled in the said casing or housing in parallel relation to the shaft 22. The shaft 22 is further supported by means of an inclined bracing member or link 26, see Fig. 1, while the shaft 25 is likewise further supported by means of the bracing member or link 27.

The said shafts 22 and 25 respectively carry the rolls or mangles 28 and 29, the former of which is preferably hollow, as indicated, to accommodate one end of a pipe 30 which serves as a burner pipe for the combustion of gas or liquid fuel within the said roll 28. The said pipe may be supported by means of a bracket 31 secured to the bracing link 26 and the flow of the gaseous or liquid fuel therethrough, or of the steam where the latter is employed for heating purposes, may be controlled by means of the valve 32. The casing 15 may be provided with a door 33 to permit access to its interior for inspection, repair, or lubrication of the parts therein.

Suitably supported beneath the mangles or rolls 28 and 29, as by the bracket 35 and the inverted U-shaped member 36, is a table 37, which is adapted to support the work during the ironing operation.

Figure 4:
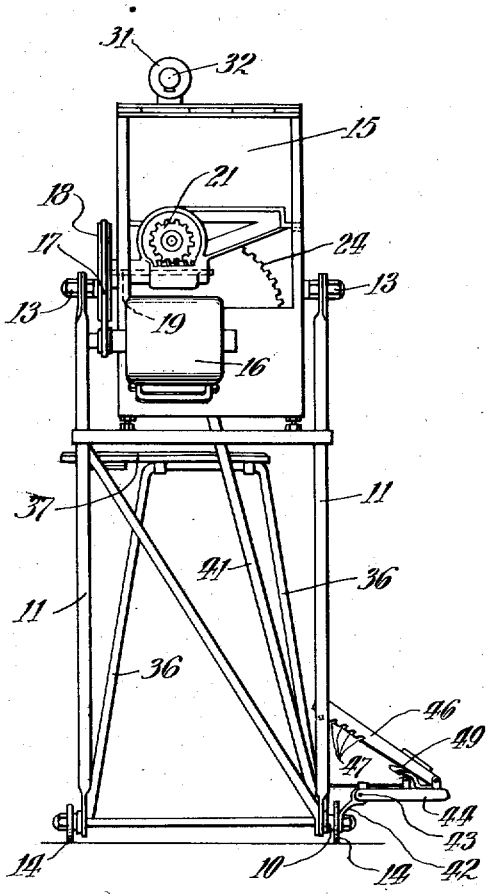
Fig. 4 is a side elevational view of the parts shown in Fig. 1, as seen from the left of the said figure.
Figure 5:
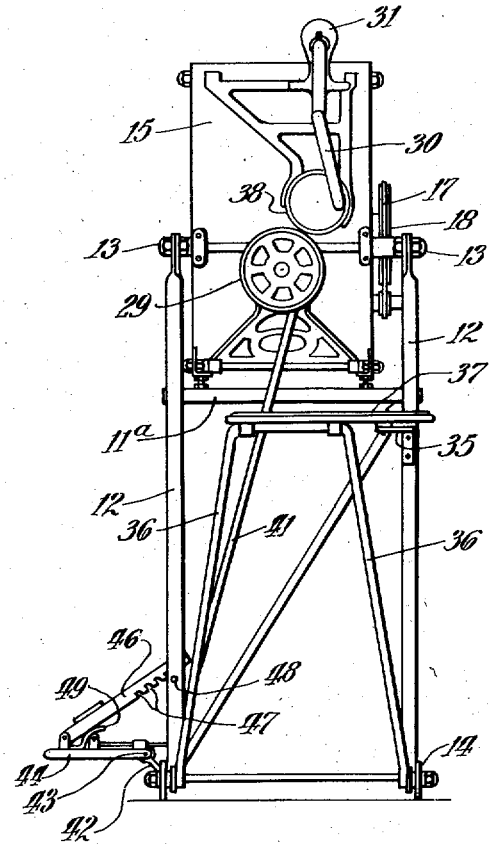
Fig. 5 is a side elevational view of the parts shown in Fig. 1 as seen from the right of the said figure.

In order to control the pressure between the rolls 28 and 29, the latter of which is preferably covered with cloth or other fabric, the link member 27 is connected to a collar 38 which is mounted upon the shaft 25 and which permits rotation of the said shaft therein. The said link member 27 is also provided with a pin 39 which is adapted to be engaged by the socket 40, see Fig. 3, of the upwardly extending rod 41, the lower end of which is connected to a lever or arm 42 rigid with a rock shaft 43, which also carries a treadle or lever 44, see Figs. 4 and 5.

It thus results that when the treadle or lever 44 is depressed the motion is transmitted through the rock shaft 43 and lever arm 42 to the upwardly extending rod 41 which exerts a pressure upon the pin 39, thereby causing the link member 27 and collar 38 to tend to press the shaft 25 and roll 29 upwardly, thus increasing the pressure of the said roll 29 against the roll 28, as will be readily apparent.

In order to permit a slight relative movement between the rolls 28 and 29, the shaft 25 may be pivotally mounted in the casing 15, as at 45. It will be understood, however, that the relative movement is not great enough to disengage the gears 24 and 23 or to cause them to bind.

The treadle 44 is provided with a latch 46 having a plurality of notches or indentations 47 which are adapted to engage a pin 48 when it is desired to maintain a constant pressure between the rolls 28 and 29. A spring 49 is provided which tends to normally maintain the said notches out of engagement with the said pin and this spring will release the latch 46 whenever a slight pressure is applied thereto and then removed.

As above stated it is one of the primary objects of this invention to provide a mechanism which may be folded up in order to occupy a minimum amount of space, and, as was above described, the casing or housing 15 is pivotally connected to the framework by the bolts 13. In order to limit the movement of the auxiliary frame 15 in one direction and maintain the parts in the operative positions illustrated in Figs. 1, 2, 4 and 5, there is provided a stop-abutment 11ª on the base-frame 11 against which a portion of the auxiliary frame 15 may bear, there being also provided a latch 50 mounted upon the upright members 11 and adapted to engage a portion of the casing 15, as will be clear from Fig. 1.

When it is desired to fold up the machine, the catch 51 with which the table 37 is provided, is released from the bracket 35, thereby permitting the said table to pivot upon its U-shaped support 36 and to drop downwardly. The latch 50 is then released, freeing the casing 15 and the mangles or rolls 28 and 29, as well as the burner pipe 30, for movement in a clockwise direction about the pivot bolts 13 to the positions indicated in Fig. 3. It will of course be understood that a suitable flexible connection is provided between the burner pipe 30 and the source of the fuel supply in order that the said pipe may swing, as just described.

It will thus be seen that this invention provides a relatively small and compact ironing machine suitable for household use and which may be folded up when not in use to occupy a relatively small space.

It is obvious that those skilled in the art may vary the details of construction as well as the arrangement of parts without departing from the spirit of the invention, and therefore it is not wished to be limited to the above disclosure except as may be required by the claims.

I claim:

1. An ironing machine comprising a frame; a housing; a pair of pressure rolls rotatably carried by said housing; a motor also carried by said housing for rotating said rolls; means for heating said rolls; a horizontal pivotal connection between said frame and housing, said housing, together with the parts carried thereby, being movable about said pivotal connection from an operative horizontal extended position to an inoperative compact vertical position within said frame; and means engaging said frame and housing to maintain the parts in their operative positions.

2. An ironing machine of the class described comprising a supporting frame; an auxiliary supporting frame pivotally secured to said first frame; a pair of substantially parallel disposed rolls mounted in said auxiliary frame; link connections between said auxiliary frame and one of said rolls whereby said roll may be adjusted toward and from its companion roll; foot actuated means engaging said link connections for causing said adjusting movements; a motor also carried by said auxiliary frame; and constantly engaged driving connections between said motor and said rolls.

3. An ironing machine of the class described comprising a main supporting frame; an auxiliary supporting frame pivotally secured to said main frame; a pair of substantially parallel disposed rolls mounted in said auxiliary frame, one of said rolls being relatively fixedly journalled in said frame; link connections between said auxiliary frame and the other of said rolls for floatingly mounting said roll in said frame for movement toward and from its companion roll; foot actuated means readily detachably engaging said link connections for causing said movement; a motor carried by said auxiliary frame; and constantly engaged driving connections between said motor and said rolls.

4. An ironing machine comprising a main supporting frame; an auxiliary frame; coacting ironing elements carried by said auxiliary frame and one of them being a rotatable roll; means for heating one of said ironing elements carried by said auxiliary frame; a motor also carried by said auxiliary frame for rotating said roll; a horizontal pivotal connection between said main supporting frame and said auxiliary frame, said auxiliary frame together with the parts carried thereby being movable about said pivotal connection from an operative horizontal extended position to an inoperative compact vertical position within said main supporting frame; and means for positioning said pivoted parts horizontally for use.

5. In a household ironing machine, the combination of a main frame of relatively small plan area; an auxiliary frame; working parts assembled on and carried by said auxiliary frame, for movement therewith as a unit, and including elongated ironing elements, one whereof is a roll to be driven, and means for heating one of said ironing elements; a pivotal connection between said main frame and auxiliary frame for pivotal movement of said assembled unit from a substantially horizontal operating position wherein said ironing elements extend beyond the plan area of said main frame, to a compactly-folded substantially vertical position of disuse wherein said assembled unit is directly above and substantially included within the plan area of said main frame; a motor for driving said roll; and means for positioning said assembled unit horizontally for use.

6. A household ironing machine comprising a main frame of relatively small base area adequate for solely-supporting the hereinafter-mentioned pivoted unit in position for use; an auxiliary frame pivoted to the top portion of said main frame; working parts assembled on said auxiliary frame for movement therewith as a pivoted unit and comprising, at one side of said pivot, a motor and, extending beyond the other side of said pivot, elongated ironing elements one whereof is a roll rotatable by said motor, and comprising also means for heating one of said ironing elements; said unit being pivotally movable from a substantially horizontal position wherein the elongated ironing elements extend beyond said base area of the main frame, to a compact substantially-vertical position of disuse wherein said pivoted unit is directly above said base area of said main frame; and means on one of said frames for coaction with the other frame to position said pivotally movable unit horizontally for use.

7. The combination in an ironing machine of a supporting standard, a frame pivoted on said standard, ironing elements carried by said frame, means carried by said frame for operating said ironing elements and cooperating means carried by said frame and said standard for locating said ironing elements in horizontal position after a tilting movement of said frame.

8. The combination in an ironing machine of a supporting standard having an enlarged base and an upwardly extending part, a housing, ironing elements carried by said housing and extending normally in a horizontal direction, means for pivotally supporting said housing on said upwardly extending part of said standard for permitting said housing and said ironing elements to be moved to an upright position, and driving mechanism located in said housing for actuating said ironing elements.

9. An ironing machine comprising a main supporting frame; an auxiliary frame; coacting ironing elements carried by said auxiliary frame and one of them being a rotatable roll; a motor also carried by said auxiliary frame for rotating said roll; a horizontal pivotal connection between said main supporting frame and said auxiliary frame, said auxiliary frame together with the parts carried thereby being movable about said pivotal connection from an operative horizontal extended position to an inoperative compact vertical position within said main supporting frame; and means for positioning said pivoted parts horizontally for use.

10. In a household ironing machine, the combination of a main frame of relatively small plan area; an auxiliary frame; working parts assembled on and carried by said auxiliary frame, for movement therewith as a unit, and including elongated ironing elements, one whereof is a roll to be driven, a pivotal connection between said main frame and auxiliary frame for pivotal movement of said assembled unit from a substantially horizontal operating position wherein said ironing elements extend beyond the plan area of said main frame, to a compactly-folded substantially vertical position of disuse wherein said assembled unit is directly above and substantially included within the plan area of said main frame; a motor for driving said roll; and means for positioning said assembled unit horizontally for use.

In witness whereof, I affix my signature.

FRANK D. CHAPMAN.